US008900732B2

(12) United States Patent
Kang et al.

(10) Patent No.: US 8,900,732 B2
(45) Date of Patent: Dec. 2, 2014

(54) APPARATUS AND METHOD FOR CONTROLLING TEMPERATURE OF BATTERY

(75) Inventors: Jinwook Kang, Yongin-si (KR); Hyunghoon Lim, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 89 days.

(21) Appl. No.: 13/327,656

(22) Filed: Dec. 15, 2011

(65) Prior Publication Data

US 2012/0156530 A1 Jun. 21, 2012

(30) Foreign Application Priority Data

Dec. 16, 2010 (KR) ........................ 10-2010-0128957

(51) Int. Cl.
*H01M 10/50* (2006.01)
*H01M 10/63* (2014.01)
(52) U.S. Cl.
CPC .................................. *H01M 10/502* (2013.01)
USPC .................................. 429/50; 429/61; 429/62
(58) Field of Classification Search
CPC ..................................................... H01M 10/502
USPC .............................................. 429/50, 61, 62
See application file for complete search history.

(56) References Cited

U.S. PATENT DOCUMENTS

| 7,647,788 | B2 | 1/2010 | Okuda et al. | |
|---|---|---|---|---|
| 2003/0234630 | A1* | 12/2003 | Blake | 318/471 |
| 2007/0072061 | A1 | 3/2007 | Shimizu | |
| 2007/0219756 | A1* | 9/2007 | Frankel et al. | 702/188 |
| 2009/0024252 | A1 | 1/2009 | Aridome et al. | |
| 2009/0075160 | A1* | 3/2009 | Tezuka et al. | 429/62 |
| 2011/0059347 | A1* | 3/2011 | Lee et al. | 429/120 |
| 2011/0064981 | A1* | 3/2011 | Scheucher | 429/99 |
| 2013/0288089 | A1* | 10/2013 | Kinoshita et al. | 429/62 |
| 2013/0302658 | A1* | 11/2013 | Soga et al. | 429/62 |

FOREIGN PATENT DOCUMENTS

| JP | 2000-100481 A | 4/2000 |
|---|---|---|
| JP | 2005-063689 A | 3/2005 |
| JP | 2005-184979 A | 7/2005 |
| KR | 10-2003-0075013 A | 9/2003 |

(Continued)

OTHER PUBLICATIONS

Korean Notice of Allowance dated Jul. 31, 2013 for Korean Patent Application No. KR 10-2010-0128957 which corresponds to captioned U.S. Appl. No. 13/327,656.

(Continued)

*Primary Examiner* — Jonathan Jelsma
*Assistant Examiner* — Rashid Alam
(74) *Attorney, Agent, or Firm* — Knobbe Martens Olson & Bear

(57) ABSTRACT

According to some aspects, an apparatus and a method for controlling a temperature of a battery are disclosed. A cooling fan may be controlled according to a temperature of the battery, thereby preventing a reduction in performance of the battery. According to one aspect, the apparatus includes a temperature sensor configured to output an analog resistance value as a temperature of batteries of a battery pack. The apparatus further includes a battery temperature control part configured to convert the analog resistance value of the temperature sensor into a digital signal to control the temperature of the battery pack, and a cooling fan that is operated by a signal from the battery temperature control part. The battery temperature control part may include a defect discrimination part that senses a defective operation of the cooling fan.

7 Claims, 4 Drawing Sheets

(56) References Cited

FOREIGN PATENT DOCUMENTS

| KR | 10-2007-0035969 A | 4/2007 |
| KR | 10-2008-0091495 A | 10/2008 |
| KR | 10-2010-0001736 A | 1/2010 |

OTHER PUBLICATIONS

Korean Office Action dated Jan. 30, 2013 for Korean Patent Application No. KR 10-2010-0128957 which corresponds to captioned U.S. Appl. No. 13/327,656.

* cited by examiner

APPARATUS AND METHOD FOR CONTROLLING TEMPERATURE OF BATTERY

CROSS-REFERENCE TO RELATED APPLICATIONS

This application claims the benefit of Korean Patent Application No. 10-2010-0128957, filed on Dec. 16, 2010, in the Korean Intellectual Property Office, and entitled: "APPARATUS AND METHOD FOR CONTROLLING TEMPERATURE OF BATTERY," the disclosures of which are incorporated herein in their entirety by reference.

BACKGROUND

1. Field

The disclosed technology relates to an apparatus and a method for controlling a temperature of a battery.

2. Description of the Related Technology

High-capacity secondary batteries are used as power sources of electric vehicles (EVs) and hybrid electric vehicles (HEVs). A plurality of secondary batteries (unit batteries) are connected in series or in parallel to form a mid-sized or large-size battery pack. However, such mid-size or large-size battery packs emit a large amount of heat while being charged or discharged. Due to this large amount of heat, the battery may be damaged. Thus, a mid-size or large-size battery pack includes a battery management system (BMS) that monitors the states of batteries such that the batteries can be used under optimal conditions.

A high-capacity battery pack, such as an energy storage system (ESS), is used in equipment requiring a large amount of power. When a capacity or performance of the battery disposed in the high-capacity battery pack is reduced or an abnormal voltage is sensed, it may be difficult to control a switching device configured to switch between a charge and discharge state of the battery pack. In addition, a main power of the high-capacity battery pack may be cut off from the switching device in an emergency.

SUMMARY OF CERTAIN INVENTIVE ASPECTS

According to one aspect, a battery temperature control apparatus is disclosed. The battery temperature control apparatus includes a temperature sensor configured to output an analog resistance value indicative of a temperature of a battery, a battery temperature control part configured to convert the analog resistance value of the temperature sensor to a digital signal, and generate a driving signal for controlling a cooling fan based on the digital signal, and a cooling fan that is operated by the driving signal from the battery temperature control part. The battery temperature control part includes a defect discrimination part configured to sense whether the operation of the cooling fan is defective.

According to another aspect, a battery temperature control method is disclosed. The battery temperature control method includes sensing a temperature of a battery by detecting a resistance value, comparing the sensed temperature with a first set temperature, applying power to a cooling fan if the sensed temperature exceeds the first set temperature, operating the cooling fan by controlling a rotation speed of the cooling fan according to the temperature of the battery, determining whether the cooling fan has a defect according to a rotation speed of the cooling fan, and displaying the defect of the cooling fan by turning a light emitting diode (LED) on when the defect is determined.

According to another aspect, a battery pack is disclosed. The battery pack includes a temperature sensor configured to output an analog resistance value as a temperature of a battery a battery temperature control part configured to convert the analog resistance value of the temperature sensor to a digital signal, and determine a driving signal for controlling a cooling fan based on the digital signal, and a cooling fan that is operated by the driving signal from the battery temperature control part.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain principles of the present disclosure. In the drawings.

DETAILED DESCRIPTION OF CERTAIN INVENTIVE EMBODIMENTS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Hereinafter, embodiments will be described in detail with reference to the accompanying drawings.

First, a battery temperature control apparatus will now be described according to some embodiments.

Figure 1:
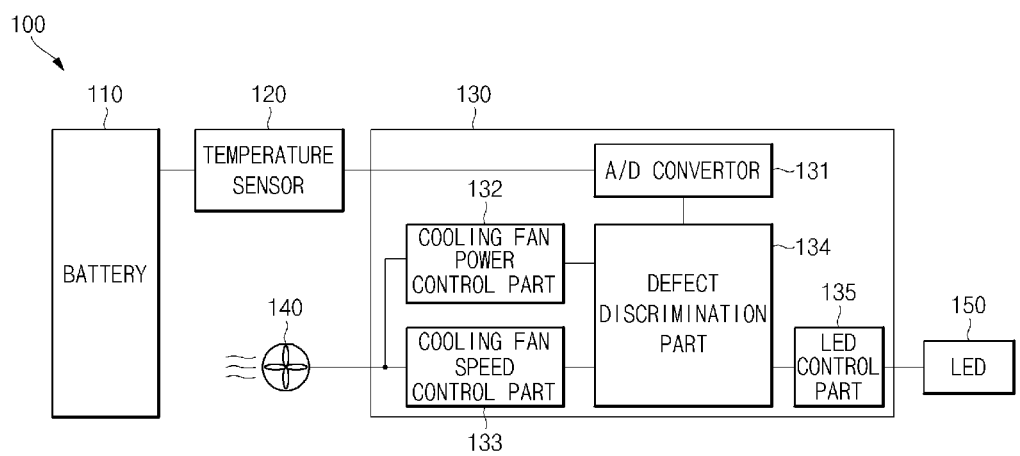
FIG. 1 is a block diagram illustrating a battery temperature control apparatus according to some embodiments.
Figure 2:
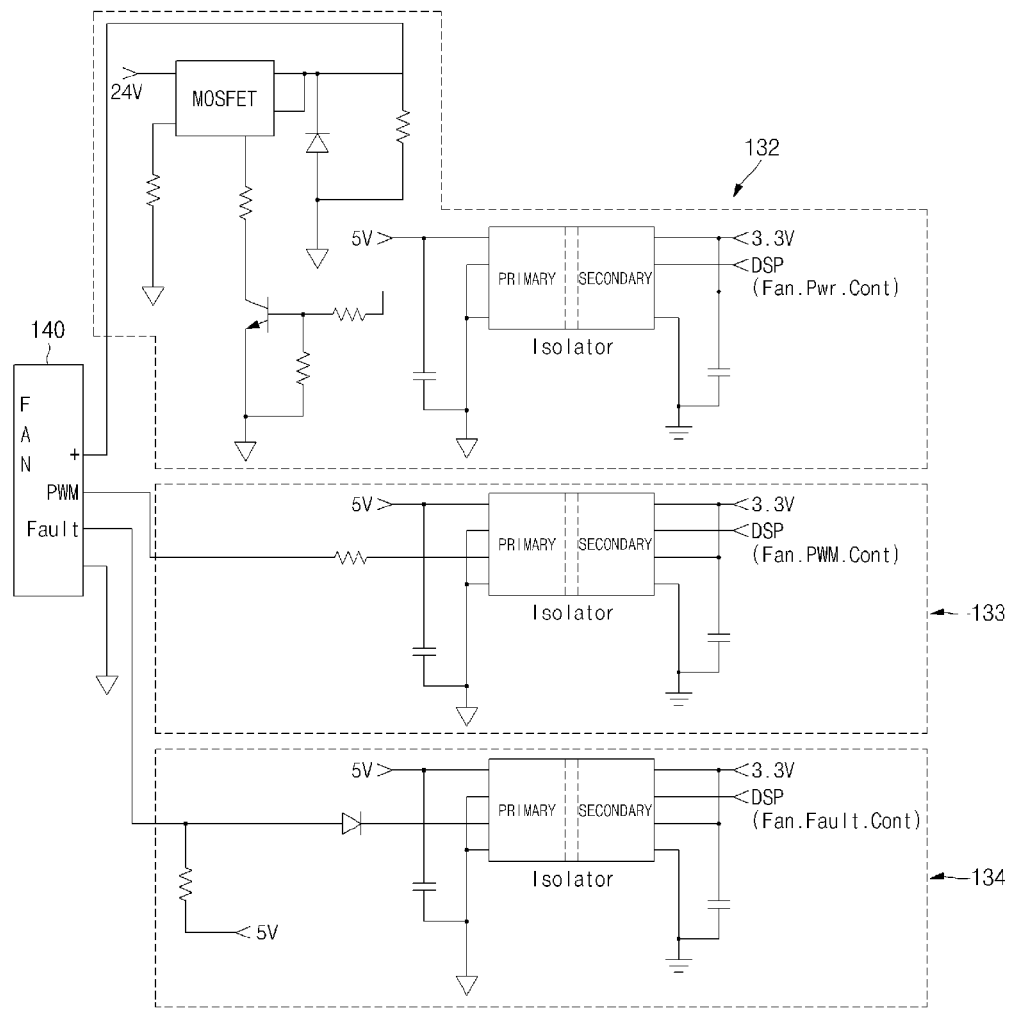
FIG. 2 is a circuit diagram for driving a cooling fan of the battery temperature control apparatus of FIG. 1.
Figure 3:
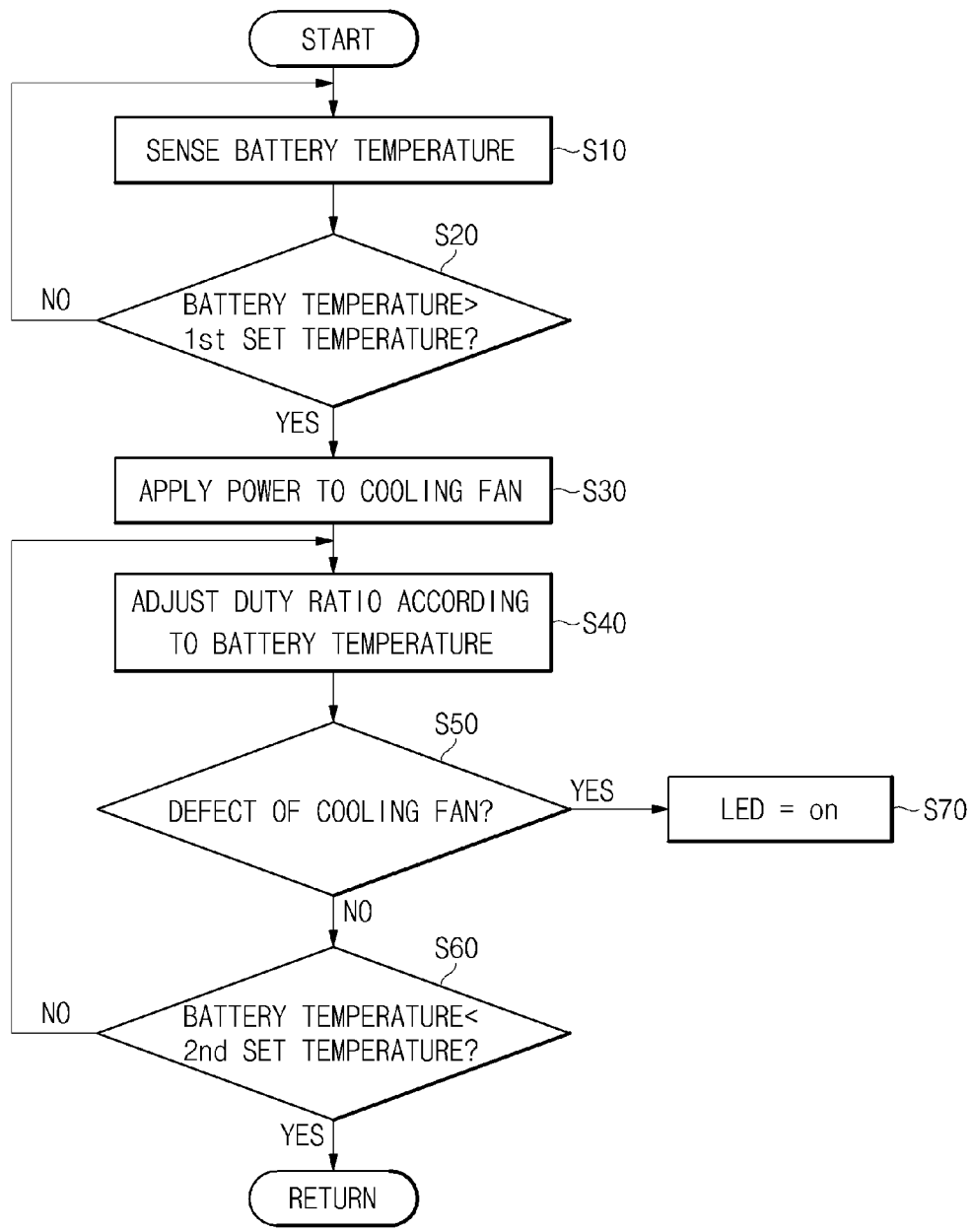
FIG. 3 is a flowchart illustrating a temperature control method using the battery temperature control apparatus of FIG. 1.
Figure 4:
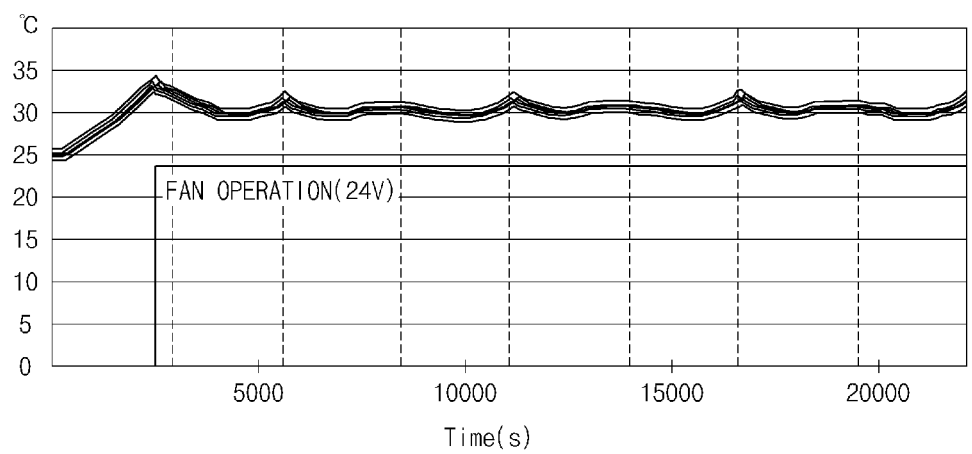
FIG. 4 is a graph illustrating a temperature according to an operation of a cooling fan of FIG. 3.
Figure 5:
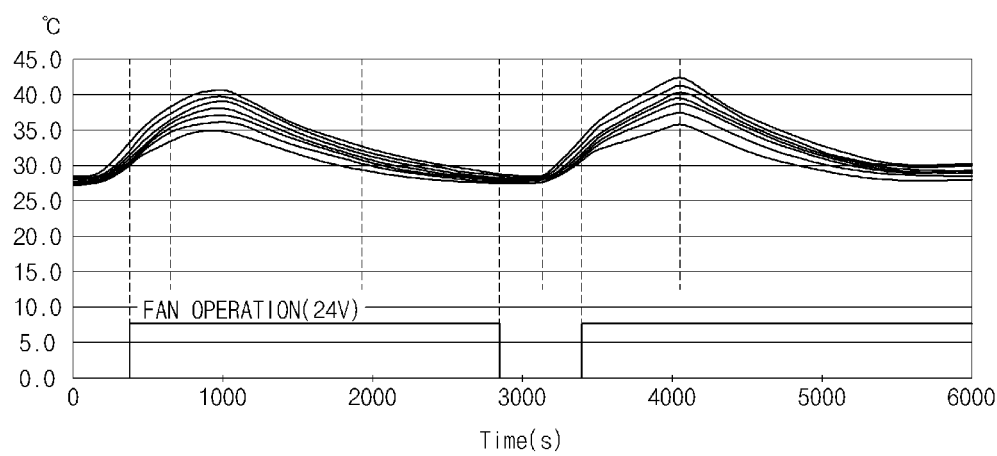
FIG. 5 is a graph illustrating an operation of the cooling fan according to a temperature variation of a battery of FIG. 3.

FIG. 1 is a block diagram illustrating a battery temperature control apparatus according to some embodiments. FIG. 2 is a circuit diagram for driving a cooling fan of the battery temperature control apparatus of FIG. 1. FIG. 3 is a flowchart illustrating a temperature control method using the battery temperature control apparatus of FIG. 1. FIG. 4 is a graph illustrating a temperature according to an operation of a cooling fan of FIG. 3. FIG. 5 is a graph illustrating an operation of the cooling fan according to a temperature variation of a battery of FIG. 3.

Referring to FIGS. 1 and 2, a battery temperature control apparatus 100 according to some embodiments includes a battery 110, a temperature sensor 120, a temperature control part 130, and a cooling fan 140. The battery temperature control apparatus 100 may further includes a light emitting diode (LED) 150.

The temperature sensor 120 senses a temperature of a battery 110. The temperature sensor 120 can detect a resistance value as a measured temperature. The sensed resistance value is converted into a digital signal at an analog/digital (A/D) convertor part 131, and is output to a defect discrimination part 134. The digital signal is used to drive the cooling fan 140 and adjusts the number of rotations of the cooling fan 140 according to a temperature of the battery 110.

The temperature sensor 120 senses a temperature increase of the battery 110 while being charged or discharged. The temperature sensor 120 may include a thermistor and a resistor. The resistor can convert a sensed temperature of the battery 110 to a resistance value. The resistance value varies in real time according to a temperature.

The temperature control part 130 includes the A/D converter part 131, a cooling fan power control part 132, a cooling fan speed control part 133, a defect discrimination part 134, and an LED control part 135.

The temperature control part 130 includes a micro computer (Micom). Input signals are classified into a driving signal for the cooling fan 140 and a speed adjustment signal for the cooling fan 140. The speed adjustment signal for the cooling fan 140 may be output using a pulse width modulation (PWM) method, or the like. While illustrated as separate units in FIG. 1, the temperature sensor 120 and the temperature control part 130 may be part of a battery pack which includes the battery 110.

The A/D converter part 131 converts a resistance value input in real time to a digital signal. The A/D converter part 131 outputs the digital signal to the defect discrimination part 134.

With reference to FIG. 2, the cooling fan power control part 132 includes a high speed switching device. The high speed switching device can be configured as a metal oxide semiconductor field effect transistor (MOSFET), and an insulated-gate bipolar transistor (IGBT). When the cooling fan power control part 132 receives a driving signal from the temperature sensor 120, the cooling fan power control part 132 applies power to the cooling fan 140.

The cooling fan speed control part 133 uses a signal input using the PWM method to adjust a duty ratio of a driving signal. The duty ratio is controlled in order to adjust the number of rotations of the cooling fan 140. The duty ratio may be adjusted to about 50%, 75%, 100%, or any duty ratio therebetween. The duty ratio may also be adjusted to a duty ratio of less an 50%. The cooling fan speed control part 133 adjusts the number of rotations of the cooling fan 140 to adjust a temperature of the battery 110. A temperature of the battery 110 is adjusted as described above, to continually perform charging/discharging operations.

The defect discrimination part 134 senses the number of rotations of the cooling fan 140 in order to sense a defect. When the defect discrimination part 134 senses a defect, the defect discrimination part 134 instructs the LED control part 135 to turn on the LED 150.

The cooling fan 140 is configured to cool the battery 110. Power is supplied to the cooling fan 140 by a driving signal input from the temperature control part 130. The number of rotations of the cooling fan 140 is adjusted by a cooling fan speed adjustment signal input in real time according to a temperature of the battery 110.

FIG. 3 illustrates a battery temperature control method according to some embodiments. A temperature is sensed in block S10. The sensed temperature is compared to a first set temperature as illustrated by decision block S20. If the sensed temperatures is greater than the first set temperature, the method proceeds to block S30. However, if the sensed temperature is less than the first set temperature, the method returns to block S10 and continues to monitor the temperature of the battery. As a result, the method may determine when a battery temperature exceeds a predetermined threshold value.

At block S30, power is applied to a cooling fan in order to control the temperature of the battery. The duty ratio of a driving signal for controlling the operation of the fan is controlled based on the battery temperature as illustrated in block S40. At decision block S50, it is determined whether the cooling fan has a defect. If it is determined that the cooling fan has a defect, the method triggers an LED to turn on to indicate the defect as illustrated in block S70.

If no defect is detected, the method proceeds to decision block S60. At decision block S60, the battery temperature is compared to a second set temperature as will be described in greater detail below. If the battery temperature is less than the second set temperature, the method may turn off the cooling fan and return to monitoring the battery temperature. If the battery temperature is greater than the second set temperature, the method returns to block S40, and an adjustment to the duty ratio of the driving signal for the cooling fan is performed based on the battery temperature.

In more detail, a temperature of the battery 110 is sensed at block S10. The temperature of the battery 110 increases while being charged or discharged. For example, a temperature of the battery 110 is sensed at the temperature sensor 120 at block S10. A resistance value may be detected as the sensed temperature using the thermistor and the resistor. The resistance value is converted into an analog signal, and the analog signal is transmitted to the temperature control part 130. The analog signal may have a small amplitude.

The analog signal is converted into a digital signal at the A/D converter part 131. The converted digital signal is compared with a first set temperature at block S20. The first set temperature is a temperature where the performance of the battery 110 is reduced during charging and discharging. The temperature control part 130 includes the Micom. A temperature sensed at the Micom is compared with the first set temperature. The sensed temperature and the first set temperature are compared and analyzed in the form of digital signals by the Micom. Hereinafter, temperatures denote digital signals converted at the A/D converter part 131. When the sensed temperature is lower than the first set temperature, it is unnecessary to drive the cooling fan. As the temperature of the battery 110 increases, the temperature of the battery 110 is continually sensed in real time by the temperature sensor 120. When the sensed temperature is higher than the first set temperature, the cooling fan power control part 132 outputs a cooling fan power application signal to drive the cooling fan, thereby preventing a reduction in performance or capacity of the battery 110.

At block S30, power is applied to the cooling fan 140 by the cooling fan power application signal. With reference to block S40, the duty ratio of the cooling fan 140 is adjusted using a PWM method, or the like, according to a temperature of the battery 110 to control the number of rotations of the cooling fan 140. At block S60, the temperature of the battery 110 is compared with a second set temperature. The second set temperature may be the minimum temperature of the battery 110 after the cooling fan 140 operates. At block S40, the cooling fan 140 is operated to cool the battery 110. According to so me embodiments, when the temperature of the battery 110 is lower than the second set temperature, the cooling fan 140 is stopped. However, when the temperature of the battery 110 is higher than the second set temperature, the number of rotations of the cooling fan 140 is controlled in order to control the temperature of the battery 110.

Referring to FIGS. 4-5, as the cooling fan 140 operates, the battery 110 is cooled down. When the temperature of the battery 110 reaches the minimum value, the cooling fan 140 is stopped. Thereafter, even when the temperature of the battery 110 increases again, the cooling fan 140 does not instantaneously operate. For example, as illustrated in FIGS.

4-5, when an increased temperature of the battery 110 is higher than the first set temperature, the cooling fan 140 operates to adjust the temperature of the battery 110.

With reference to FIG. 4, according to some embodiments, the cooling fan may continue to operate such that the temperature of the battery is controlled to be below a predetermined temperature. As discussed above, the duty ratio of a driving signal of the cooling fan can be controlled such that the number of rotations of the cooling fan is adjusted based on the sensed temperature of the battery. For example, with reference to FIG. 5, when the temperature of the battery 110 ranges from about 35° C. to about 40° C., the number of rotations of the cooling fan 140 is controlled by adjusting the duty ratio using the PWM method such that the cooling fan 140 operates at a duty ratio ranging from about 50% to about 70%. When the temperature of the battery 110 is higher than about 40° C., the duty ratio is adjusted using the PWM method such that the cooling fan 140 operates with a driving signal having a duty ratio or approximately 100%. For example, at time point T=4000s illustrated in FIG. 5, the temperature of the battery may be sensed to be in excess of 40° C. As a result, the cooling fan 140 may be operated with a driving signal having a duty ratio of approximately 100%.

With continued reference to FIG. 5, the temperature of the battery 110 is continuously sensed by the temperature sensor 120. As a result, when a temperature again exceeds a first set temperature, as illustrated in FIG. 5, the cooling fan 140 is again operated in order to control the temperature of the battery 110.

With returned reference to FIG. 3, at block S40, a speed of the cooling fan 140 can be automatically controlled according to a temperature of the battery 110. At block S50, a defect of the cooling fan 140 is sensed in operation. This defect may correspond to a non-responsive cooling fan 140. For example, although power is applied to the cooling fan 140 at block S30, the cooling fan 140 may not operate. The defect may be determined by the defect discrimination part by comparing a set speed of the cooling fan with an actual rotation speed of the cooling fan. If the set speed does not match the actual rotation speed, a defect is detected. As a result, the cooling fan 140 transmits a defect signal to the temperature control part 130. At block S50, the presence of a defect of the cooling fan 140 is determined based on the defect signal transmitted from the cooling fan 140. At block S50, the temperature of the battery 110 is compared with a signal of the cooling fan speed control part 133 at the temperature control part 130 to determine whether the cooling fan 140 has a defect.

At block S70, the LED control part 135 turns the LED 150 on by the defect signal.

According to some embodiments described above, an apparatus and a method for controlling a temperature of a battery, which sense a temperature of the battery while being charged or discharged so as to control a cooling fan. In some aspects, the speed or rotation of the cooling fan can be controlled based on the sensed temperature.

According to some embodiments, an apparatus and a method for controlling a temperature of a battery are disclosed which enable continuously charging or discharging the battery.

According to some embodiments, a battery temperature control apparatus includes a temperature sensor configured to output an analog resistance value as a temperature of batteries in a battery pack. The temperature control apparatus also includes a battery temperature control part configured to convert the analog resistance value of the temperature sensor into a digital signal to control the temperature of the battery pack, and a cooling fan that is operated by a signal from the battery temperature control part, wherein the battery temperature control part includes a defect discrimination part that senses a defective operation of the cooling fan. The defect discrimination part may compare a set speed of the cooling fan with a real rotation speed to sense a defect.

The battery temperature control part may include: an analog/digital (A/D) converter part configured to convert the analog resistance value into a digital signal, a cooling fan power control part configured to process the digital signal to apply power to the cooling fan, and a cooling fan speed control part configured to control a rotation speed of the cooling fan according to the temperature of the battery. The cooling fan speed control part may control the rotation speed at a duty ratio ranging from about 50% to about 100% using a pulse width modulation (PWM) method.

The battery temperature control apparatus may further include a cooling fan defect discrimination part that determines a defect when the cooling fan is in off state even when receiving a power application signal, or when the cooling fan does not rotate at an input rotation speed. The defect discrimination part may include a light emitting diode (LED) control part that turns a light emitting diode (LED) on when sensing a defect signal.

According to some embodiments, a battery temperature control method includes: sensing a temperature of a battery by detecting a resistance value; comparing the sensed temperature with a first set temperature to apply power to a cooling fan, operating the cooling fan by controlling a rotation speed of the cooling fan according to the temperature of the battery, determining whether the cooling fan has a defect according to a rotation speed after the operating of the cooling fan, and displaying the defect of the cooling fan by turning a light emitting diode (LED) on when the defect is sensed. In the applying of the power to the cooling fan, the power may be applied to the cooling fan when the sensed temperature is higher than the first set temperature.

The operation of the cooling fan may include controlling a speed of the cooling fan at a duty ratio ranging from about 50% to about 70% using a pulse width modulation (PWM) method when the sensed temperature ranges from about 35° C. to about 40° C. The operation of the cooling fan may include controlling a speed of the cooling fan at a duty ratio of about 100% using a pulse width modulation (PWM) method when the sensed temperature is higher than about 40° C.

Determining the defect of the cooling fan may include transmitting a defect signal from the cooling fan to a battery temperature control part in a case where the cooling fan is in off state even when receiving a power application signal.

According to some embodiments, a temperature of the battery can be sensed while being charged or discharged, to control the number of rotations of the cooling fan.

According to some embodiments, a high capacity battery can be continuously charged and discharged.

According to some embodiments, a temperature of the battery measured during charging/discharging is adjusted to maximize the service life and capacity thereof and improve the safety thereof.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. A battery temperature control apparatus comprising:

a cooling fan;

a temperature sensor control part comprising:

an analog/digital (A/D) converter part in communication with the temperature sensor, A/D converter configured to convert the analog resistance value of the temperature sensor to a digital signal;

a high-speed switching device in communication with the A/D converter and a cooling fan power supply, the high speed switching device configured to process the digital signal and generate a driving signal from the cooling fan power supply for controlling the cooling fan based on the digital signal; and a cooling fan speed controller in communication with the high speed switching device and the cooling fan, the cooling fan speed controller configured to control a rotation speed of the cooling fan according to the temperature of the battery;

a defect discrimination part in communication with the high speed switching device, the defect discrimination part comprising:

a cooling fan speed sensor;

a processor configured to receive the driving signal for controlling the cooling fan and to compare the driving signal for controlling the cooling fan with a sensed actual rotation speed of the cooling fan to sense a defect when the cooling fan is in an off state even when receiving a power application signal, or when the cooling fan does not rotate at and input rotation speed.

2. The battery temperature control apparatus as claimed in claim 1, wherein the cooling fan speed control part controls the rotation speed at a duty ratio ranging from about 50% to about 100% using a pulse width modulation (PWM) method.

3. The battery temperature control apparatus as claimed in claim 1, wherein the defect discrimination part is configured to detect a defect in the cooling fan, and wherein the defect discrimination part comprises a light emitting diode (LED) control part that turns a light emitting diode (LED) on when the defect is detected.

4. A battery pack comprising:

a battery temperature control apparatus comprising:

a cooling fan;

a temperature sensor control part comprising: an analog/digital (A/D) converter part in communication with the temperature sensor, A/D converter configured to convert the analog resistance value of the temperature sensor to a digital signal;

a high-speed switching device in communication with the A/D converter and a cooling fan power supply, the high speed switching device configured to process the digital signal and generate a driving signal from the cooling fan power supply for controlling the cooling fan based on the digital signal;

and a cooling fan speed controller in communication with the high speed switching device and the cooling fan, the cooling fan speed controller configured to control a rotation speed of the cooling fan according to the temperature of the battery;

a defect discrimination part in communication with the high speed switching device, the defect discrimination part comprising:

a cooling fan speed sensor;

a processor configured to receive the driving signal for controlling the cooling fan and to compare the driving signal for controlling the cooling fan with a sensed actual rotation speed of the cooling fan to sense a defect when the cooling fan is in an off state even when receiving a power application signal, or when the cooling fan does not rotate at and input rotation speed.

5. The battery pack of claim 4, wherein the cooling fan speed control part controls the rotation speed at a duty ratio ranging from about 50% to about 100% using a pulse width modulation (PWM) method.

6. The battery pack of claim 4, further comprising a cooling fan defect discrimination part configured to detect a defect when the cooling fan is in an off state even when receiving a power application signal, or when the cooling fan does not rotate at an input rotation speed.

7. The battery pack of claim 4, wherein the defect discrimination part is configured to detect a defect of the cooling fan, and wherein the defect discrimination part comprises a light emitting diode (LED) control part that turns a light emitting diode (LED) on when the defect is detected.

* * * * *

UNITED STATES PATENT AND TRADEMARK OFFICE
CERTIFICATE OF CORRECTION

PATENT NO. : 8,900,732 B2
APPLICATION NO. : 13/327656
DATED : December 2, 2014
INVENTOR(S) : Jinwook Kang It is certified that error appears in the above-identified patent and that said Letters Patent is hereby corrected as shown below:

In the specification

At Column 1, Line 2, change "Bear" to --Bear, LLP--

At Column 4, Line 56, change "so me" to --some--

In the claims

In Claim 1, at Column 7, Line 33, change "and" to --an--

In Claim 4, at Column 8, Line 29, change "and" to --an--

Signed and Sealed this
Thirteenth Day of October, 2015

Michelle K. Lee
*Director of the United States Patent and Trademark Office*